United States Patent
Chen

(10) Patent No.: US 11,403,375 B2
(45) Date of Patent: Aug. 2, 2022

(54) PERMISSION MANAGEMENT SYSTEM, PERMISSION MANAGEMENT METHOD, AND ELECTRONIC DEVICE

(71) Applicant: Alibaba Group Holding Limited, Grand Cayman (KY)

(72) Inventor: Binghui Chen, Guangdong (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 781 days.

(21) Appl. No.: 16/074,344

(22) PCT Filed: Feb. 27, 2017

(86) PCT No.: PCT/CN2017/074947
§ 371 (c)(1),
(2) Date: Jul. 31, 2018

(87) PCT Pub. No.: WO2017/148341
PCT Pub. Date: Sep. 8, 2017

(65) Prior Publication Data
US 2021/0192022 A1 Jun. 24, 2021

(30) Foreign Application Priority Data
Feb. 29, 2016 (CN) .......................... 201610113509.6

(51) Int. Cl.
*G06F 21/31* (2013.01)
*G06F 21/12* (2013.01)
*G06F 21/84* (2013.01)

(52) U.S. Cl.
CPC ............ *G06F 21/31* (2013.01); *G06F 21/121* (2013.01); *G06F 21/84* (2013.01); *G06F 2221/2149* (2013.01)

(58) Field of Classification Search
CPC ........ G06F 21/31; G06F 21/121; G06F 21/84; G06F 2221/2113; G06F 2221/2149
See application file for complete search history.

(56) References Cited

U.S. PATENT DOCUMENTS 9,286,482 B1 * 3/2016 Dumont ................... G06F 21/32
2012/0023573 A1 * 1/2012 Shi .......................... G06F 21/00
726/17

(Continued)

FOREIGN PATENT DOCUMENTS

| CN | 104715173 A | 6/2015 |
| CN | 105279423 A | 1/2016 |

OTHER PUBLICATIONS

International Searching Authority, International Search Report (ISR) and Written Opinion for International Application No. PCT/CN2017/074947, dated Jun. 9, 2017, 13 pages, State Intellectual Property Office of the P.R.C., China.

*Primary Examiner* — Thaddeus J Plecha
(74) *Attorney, Agent, or Firm* — Alston & Bird LLP

(57) ABSTRACT

The embodiments of the present application provide a permission management system, a permission management method, and an electronic device. First, at least two unlocking passwords are set on the electronic device, and each unlocking password corresponds to a working mode. Then, the user permission for application software on the electronic device is configured for each working mode. Finally, upon receiving the correct input unlock password, the electronic device is unlocked and the working mode corresponding to the input unlock password is started. The embodiments of the present application can protect the personal privacy of a user by means of setting the access permission of the application software of the electronic device.

18 Claims, 5 Drawing Sheets

(56) References Cited

U.S. PATENT DOCUMENTS

| | | | |
|---|---|---|---|
| 2012/0079586 A1* | 3/2012 | Brown | G06F 3/0482 |
| | | | 726/16 |
| 2012/0291121 A1* | 11/2012 | Huang | G06F 21/32 |
| | | | 726/19 |
| 2013/0138954 A1* | 5/2013 | Draluk | H04W 40/02 |
| | | | 713/165 |
| 2014/0259152 A1* | 9/2014 | Yun | G06F 3/04883 |
| | | | 726/18 |
| 2014/0283142 A1* | 9/2014 | Shepherd | G06F 21/6245 |
| | | | 726/30 |
| 2016/0042190 A1* | 2/2016 | Adderly | G06F 21/629 |
| | | | 726/28 |
| 2016/0139905 A1* | 5/2016 | Stantchev | G06F 8/61 |
| | | | 717/177 |

* cited by examiner

X working mode application software configuration interface

List of application software installed    Please select at least one application

✓

✓

Configuring at least one function of an application software that is prohibited from using by the user in any work mode — S116

When the electronic device is unlocked and enters a corresponding working mode, in the case that the user selects to start the at least one function of an application software that is prohibited from using by the user, prohibiting the start of the function selected by the user by the corresponding application software — S117

Figure 6

PERMISSION MANAGEMENT SYSTEM, PERMISSION MANAGEMENT METHOD, AND ELECTRONIC DEVICE

CROSS-REFERENCE TO RELATED APPLICATION

The present application claims priority to and the benefit of PCT/CN2017/074947, filed Feb. 27, 2017, which claims priority to Chinese Patent Application No. 201610113509.6, filed with the Chinese Patent Office on Feb. 29, 2016, and entitled Permission Management System, Permission Management Method And Electronic Device, the entire contents of which are incorporated in their entireties herein by reference.

TECHNICAL FIELD

The present application relates to the field of intelligent electronic devices, and in particular to an electronic device and a permission management system and a permission management method for configuring and managing the permissions for application software in each working mode of the electronic device.

BACKGROUND

In the existing technology, with the development of computer technologies and electronic technologies, electronic devices such as smart phones, mobile internet devices (MIDs), and personal digital assistants (PDAs), tablet computers, and the like, have become the indispensable communication and entertainment tools in daily work and life. Many electronic devices support user-defined installation of various application software (App) to meet the needs of different users. There may be relatively private information stored in the electronic device, such as pictures, videos, or documents, etc. However, in daily life, it is unavoidable that other people may use the same device (for example, parents allow their children to use it, friends to use it, or spouse to use it) and so on. Accordingly, there is a risk of disclosure of privacy when the device is used by another person.

SUMMARY OF THE INVENTION

In light of the foregoing, one object of the present invention is to provide a permission management system, which includes:

a setting module, which is used for setting at least two unlocking passwords, wherein each unlocking password is used for unlocking an electronic device and starting a working mode;

a configuring module, which is used for configuring a permission for an application software on the electronic device for each working mode; and an unlocking module, which is used for receiving an unlocking password input by a user, and when the unlocking password input by the user is correct, unlocking the electronic device and starting the working mode corresponding to the input unlocking password.

Another preferred embodiment of the present invention further provides a permission management method, characterized in that the method comprises:

setting at least two unlocking passwords, wherein each unlocking password is used for unlocking an electronic device and starting a working mode;

configuring a permission for an application software on the electronic device for each working mode; and receiving an unlocking password input by a user, and when the unlocking password input by the user is correct, unlocking the electronic device and starting the working mode corresponding to the input unlocking password.

Another preferred embodiment of the present invention further provides an electronic device, which includes a memory, a processor and permission management. The system is installed in the memory and comprises one or a plurality of software functional modules executed by the processor.

Another preferred embodiment of the present invention further provides a computer readable recording medium having recorded thereon a program for performing the method.

Compared with the prior art, the permission management system and the permission management method provided in the preferred embodiments of the present application can set multiple working modes with different levels of permissions in an electronic device. The access permissions to the application software are different in different working modes. Different users will enter different working modes when using electronic devices. In this way, the present invention is able to protect user privacy.

In order to make the objects, features, and advantages of the present application mentioned above more clearly and easily understood, the following description will be given by way of preferred embodiments and with reference to the accompanying drawings.

BRIEF DESCRIPTION OF DRAWINGS

In order to more clearly explain the technical solutions of the embodiments of the present application, the drawings used in the embodiments will be briefly described below. It should be understood that the following drawings only show some embodiments of the present application, and therefore they should be regarded as a limitation to the scope of the present invention. For a person skilled in the art, other related drawings may also be obtained based on these drawings without involving any inventive skills.

FIG. 6 is a partial flowchart of the permission management method in yet another preferred embodiment of the present application.

DESCRIPTION OF THE SYMBOLS OF MAJOR ELEMENTS

Figure 1:
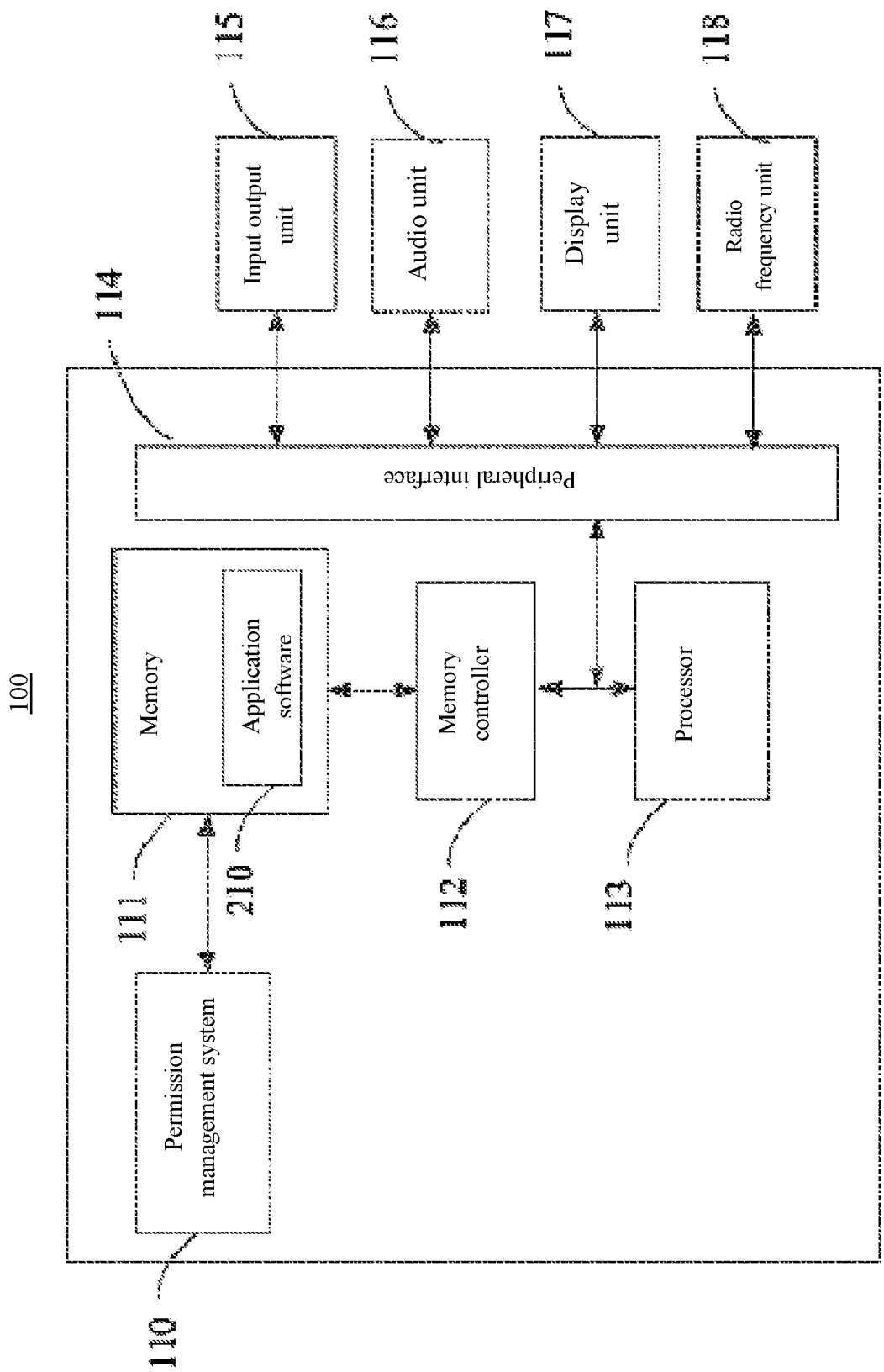
FIG. 1 is a schematic block diagram of an electronic device provided by a preferred embodiment of the present application.

| | |
|---|---|
| Electronic device | 100 |
| Permission management system | 110 |
| Memory | 111 |

| | |
|---|---|
| Memory controller | 112 |
| processor | 113 |
| Peripheral interface | 114 |
| Input output unit | 115 |
| Audio unit | 116 |
| Display unit | 117 |
| Radio frequency unit | 118 |
| Setting module | 1101 |
| Configuring module | 1102 |
| Unlocking module | 1103 |
| Start prohibiting module | 1104 |
| Icon managing module | 1105 |
| Function restricting module | 1106 |
| Application software automatically starting module | 1107 |
| Application software | 210 |

DESCRIPTION OF THE EMBODIMENTS

The technical solutions in the embodiments of the present application will be described in detail clearly and completely with reference to the accompanying drawings in the embodiments of the present application. It is apparent that the described embodiments are merely a part of the embodiments of the present application and not all of them. The components of the embodiments of the present application, which are generally described and illustrated in the figures herein, may be arranged and designed in a variety of different configurations. Thus, the following detailed description of the embodiments of the present application provided in the drawings is not intended to limit the scope of the present application, but is merely representative of selected embodiments of the application. Based on the embodiments of the present application, many other embodiments of the present invention may be obtained by a person skilled in the art without involving inventive skills, which shall fall within the protection scope of the present application.

It should be noted that the same reference numerals and letters refer to the same items in the following figures, and therefore, once an item is defined in one figure, it does not need to be further defined and explained in subsequent figures. Meanwhile, in the description of the present application, the terms "first", "second", and the like are used only to distinguish the description and cannot be interpreted as indicating or suggesting relative importance.

FIG. 1 is a block diagram of an electronic device 100. The electronic device 100 includes a permission management system 110, a memory 111, a memory controller 112, a processor 113, a peripheral interface 114, an input and output unit 115, an audio unit 116, a display unit 117, and a radio frequency unit 118. In this embodiment of the present invention, the electronic device 100 includes, but is not limited to, a smart phone, a tablet computer, a notebook computer, a personal computer, a personal digital assistant, a mobile internet device, and the like.

The memory 111, the memory controller 112, the processor 113, the peripheral interface 114, the input and output unit 115, the audio unit 116, the display unit 117, and the radio frequency unit 118 are electrically connected to each other directly or indirectly so as to achieve the data transmission or interaction. For example, these elements may be electrically connected to each other through one or more communication buses or signal lines. The permission management system 110 includes at least one software function module that can be stored in the memory 111 in the form of software or firmware or fixed in an operating system (OS) of the electronic device 100. The memory 111 stores the application software 210 that the electronic device 100 downloads and installs from a network. The processor 113 is configured to execute an executable module stored in the memory 111, for example, a software function module and a computer program included in the permission management system 110, and so on.

In this case, the memory 111 may be, but is not limited to, a random access memory (RAM), a read only memory (ROM), a programmable read only memory (PROM), an erasable read only memory (EPROM), an electrically erasable read only memory (EEPROM), and so on. In the present application, the memory 111 is used for storing a program, and the processor 113 executes the program after receiving an execution instruction. Access to the memory 111 by the processor 113 and other possible components may be performed under the control of the memory controller 112.

The processor 113 may be an integrated circuit chip with signal processing capabilities. The processor 113 mentioned above may be a general purpose processor, including a central processor (CPU), a network processor (NP), it may also be a digital signal processor (DSP), an application specific integrated circuit (ASIC), a field programmable gate arrays (FPGA), other types of programmable logic devices, a discrete gate, or a transistor logic device, a separate hardware component and so on. The disclosed methods, steps, and logic blocks in the embodiments of the present application may be implemented or executed by them. A general purpose processor may be a microprocessor or a processor for any conventional processor or the like.

The peripheral interface 114 couples various input and output devices to the processor 113 and the memory 111. In some embodiments of the present invention, the peripheral interface 114, the processor 113, and the memory controller 112 may be implemented in a single chip. In other examples, they can be implemented by separate chips.

The input and output unit 115 is configured to provide a user for inputting data so as to implement an interaction between the user and the electronic device. The input and output unit 115 may be, but is not limited to, a mouse, a keyboard, and the like.

The audio unit 116 provides a user with an audio interface that may include one or more microphones, one or more speakers, and an audio circuitry.

The display unit 117 provides an interactive interface (for example, a user operation interface) between the electronic device 100 and a user or for displaying image data. In this embodiment of the present invention, the display unit 117 may be a liquid crystal display or a touch panel display. In the case of a touch panel display, it may be a capacitive touch screen or a resistive touch screen, which supports single-point touch and multi-touch operations, and so on. Supporting single-point touch and multi-touch operations means that the touch display can sense the touch operation that is generated at one or more locations on the touch display, and the sensed touch operation is passed to the processor for calculation and processing.

The radio frequency unit 118 is configured to receive and transmit radio wave signals (such as electromagnetic waves) and achieve the mutual conversion between radio waves and electrical signals, so as to enable the electronic device 100 to download the application software 210 from the network.

Figure 2:
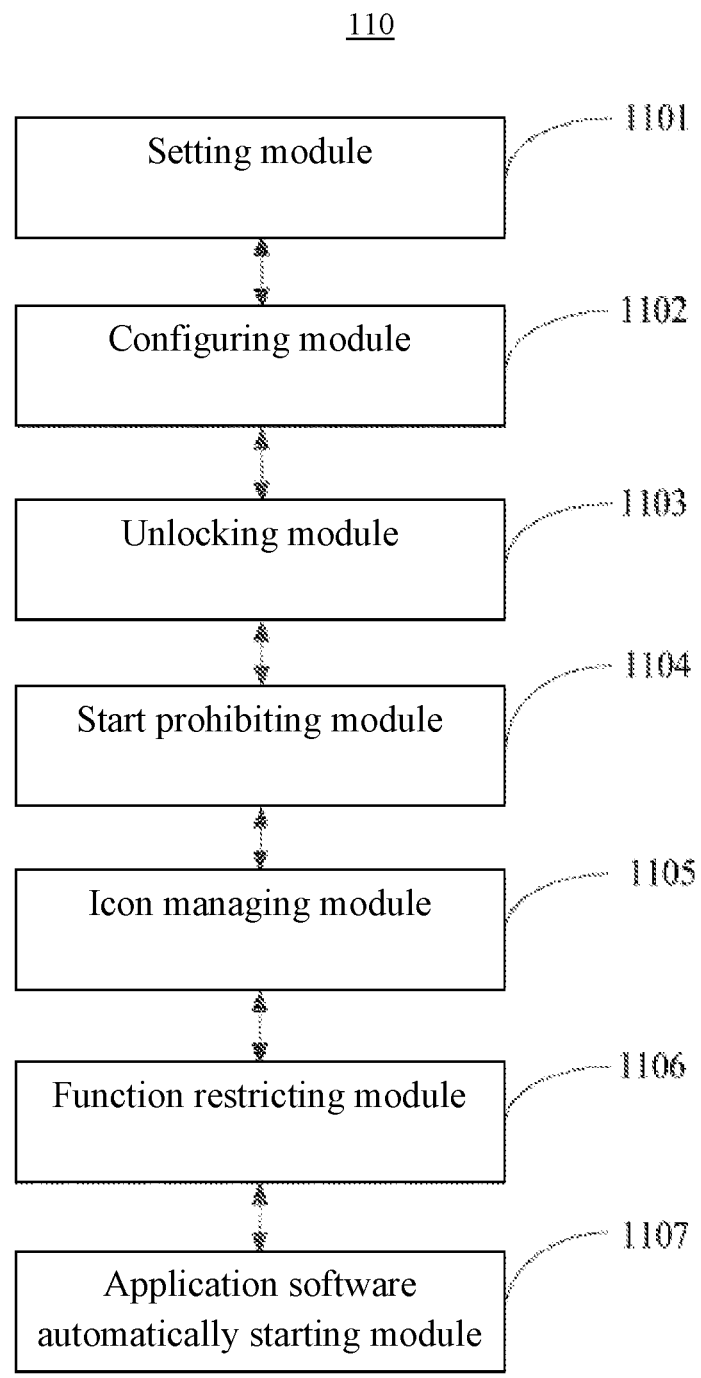
FIG. 2 is a functional block diagram of a permission management system in the electronic device shown in FIG. 1.

Please refer to FIG. 2, which is a functional block diagram of the permission management system 110 shown in FIG. 1 provided in a preferred embodiment of the present application. The permission management system 110 may include a setting module 1101, a configuring module 1102, and an unlocking module 1103.

The setting module 1101 is used for setting at least two unlocking passwords, wherein each unlocking password is used for unlocking an electronic device 100 and starting a working mode.

Specifically, a primary unlocking password and at least one low-priority secondary unlocking password may be included in the set of at least two unlocking passwords. In the working mode corresponding to the primary unlocking password, a user can have the authority or permission to operate all application software of the electronic device 100. In the working mode corresponding to the low-priority unlocking password, a user can only have the authority or permission to operate certain application software of the electronic device 100. In this embodiment of the present invention, the user with the full permission can set the specific permission and the unlocking password of the user who has only partial permission. In the foregoing, the unlocking process refers to an action of a user to wake up the electronic device 100 from a standby state to a working state by inputting specific password instructions (such as numbers, graphics, fingerprints, faces, voices, and the like).

The configuring module 1102 is used for configuring the permission for an application software 210 on the electronic device 100 for each working mode.

The configuring module 1102 is used to configure different using permissions for the application software 210 in different working modes. After the foregoing configuration is completed, the configuration information of the unlocking password and its corresponding working mode is stored in the electronic device 100.

The unlocking module 1103 is used for receiving an unlocking password input by a user, and when the unlocking password input by the user is correct, unlocking the electronic device and starting the working mode corresponding to the input unlocking password. Specifically, when the user inputs the unlocking password, the input unlocking password is compared to a previously set unlocking password. When the comparison is successful, the configuration information of the working mode corresponding to the input unlocking password is read, and finally the above configuration information is loaded to make the electronic device 100 enter a corresponding working mode.

In this embodiment, further, the process in which the configuring module 1102 configures permission for application software 210 on the electronic device 100 for each working mode includes configuring at least one application software 210 that is allowed to be used by the user for each working mode. Specifically, by means of scanning all of the application software 210 installed on the electronic device 100 and displaying the scanned application software 210 via a user interface to prompt the user to select at least one application software 210 therefrom, and then configure the at least one application software 210 selected by the user to be the application software 210 that is allowed to be used by the user.

Figure 3:
FIG. 3 is an interactive interface of the application software configuration shown in FIG. 1.
Figure 3:
Figure 3:
Figure 3:
Figure 3:
Figure 3:
Figure 3:

More specifically, in reference to FIG. 3, the configuring module 1102 can scan all of the application software 210 installed on the electronic device 100 and then display the icons or names of all of the scanned application software 210 via a user interface. Next, it can prompt the user to select at least one application software 210 therefrom, and then configure the at least one application software 210 selected by the user to be the application software 210 that is allowed to be used by the user. For example, parents may configure the player and picture application software 210 for use by their children in a working mode they set for the children.

In this embodiment, further, the process in which the configuring module 1102 configures permission for application software 210 on the electronic device 100 for each working mode also includes configuring the application software 210 that is prohibited from using by the user in any working mode. More specifically, by means of scanning all of the application software 210 installed on the electronic device 100 and displaying the scanned application software 210 via a user interface to prompt the user to select at least one application software 210 therefrom, and then configure the at least one application software 210 selected by the user to be the application software 210 that is prohibited from using by the user.

Correspondingly, as shown in FIG. 2, the permission management system 110 may further include a start prohibiting module 1104.

In one embodiment of the present invention, the start prohibiting module 1104 can be used for, when the electronic device 110 is unlocked and enters a corresponding working mode, in the case that the user selects to start the application software 210 that is prohibited from using by the user, prohibiting the start of the application software 210. Optionally, the start prohibiting module 1104 may also be used for alerting the user that the access to the application software is restricted. In the case, the action of selecting to start may be an operation of selecting or clicking an icon corresponding to the application software 210. Specifically, the alerting manner adopted by the start prohibiting module 1104 can be any one of text alerting information, voice alerting information and vibration alerting information, or any combination of the foregoing.

In other embodiments, the start prohibiting module 1104 may also display an interface for entering a password on a display interface. After the user inputs a correct password, the user who is not allowed to use the application software 210 may also use the application software 210, in this case, the correct password is the unlocking password with the permission to start the application software 210.

In another embodiment, the start prohibiting module 1104 can also be used for, when the electronic device 110 is unlocked and enters a corresponding working mode, determining whether the application software 210 that is prohibited from use by the user is running in the working mode, and if so, directly closing the application software 210. In the current available operating system (for example, the iOS or Android system) for the existing electronic device 100, the application software 210 may also run in the background after the electronic device 100 is locked, as a result, when the device is used by another person, application software 210 involving personal privacy (for example QQ, WeChat, email, contact list and the like) are not closed. If another user does not have the permission to use the above application software 210, the electronic device 100 will automatically close the above application software 210 when another user inputs the password to unlock and enter that working mode. Specifically, the electronic device 100 can close the application software 210 by means of killing the course of the application software 210.

In this embodiment, further, as shown in FIG. 2, the permission management system 110 may further include an icon managing module 1105, which is used for, when the electronic device 100 is unlocked and enters a corresponding working mode, hiding the icon of the application software 210 that is prohibited from using by the user in the working mode.

In this embodiment, further, the process in which the configuring module 1102 configures permission for application software 210 on the electronic device 100 for each working mode also includes configuring at least one function of application software 210 that is prohibited from using by the user in any working mode. Accordingly, as shown in FIG. 2, the permission management system 110 may further include a function restricting module 1106, which is used for, when the electronic device 100 is unlocked and enters a corresponding working mode, in the case that the user selects to start the at least one function of an application software 210 that is prohibited from using by the user, prohibiting the start of the function selected by the user by the corresponding application software 210. Optionally, the function restricting module 1106 may also be used for alerting the user that the access to the corresponding function is restricted.

Specifically, the configuring module 1102 may further define the function of the application software 210 that is allowed to be started by the user. For example, for a browser, the configuring module 1102 may also perform permission restriction on the browsing history record in the browser, so that the user can only use the functions other than seeing the browsing history. In this case, when the user selects to view the browsing history record, the function restricting module 1106 will alert the user that the function access is restricted. The manner in which the function restricting module 1106 can alert the user that the access to the function is restricted is similar to that of the start prohibiting module 1104, and details will not be described herein again.

In this embodiment, further, the process in which the configuring module 1102 configures permission for application software 210 on the electronic device 100 for each working mode also includes configuring the application software 210 that is allowed to automatically start in any working mode. In this regard, as shown in FIG. 2, the permission management system 110 further includes an application software automatically starting module 1107, which is used for, when the electronic device 100 is unlocked and enters a working mode that is configured with the application software 210 that is allowed to start automatically, automatically starting the application software 210 that is allowed to start automatically.

Figure 4:
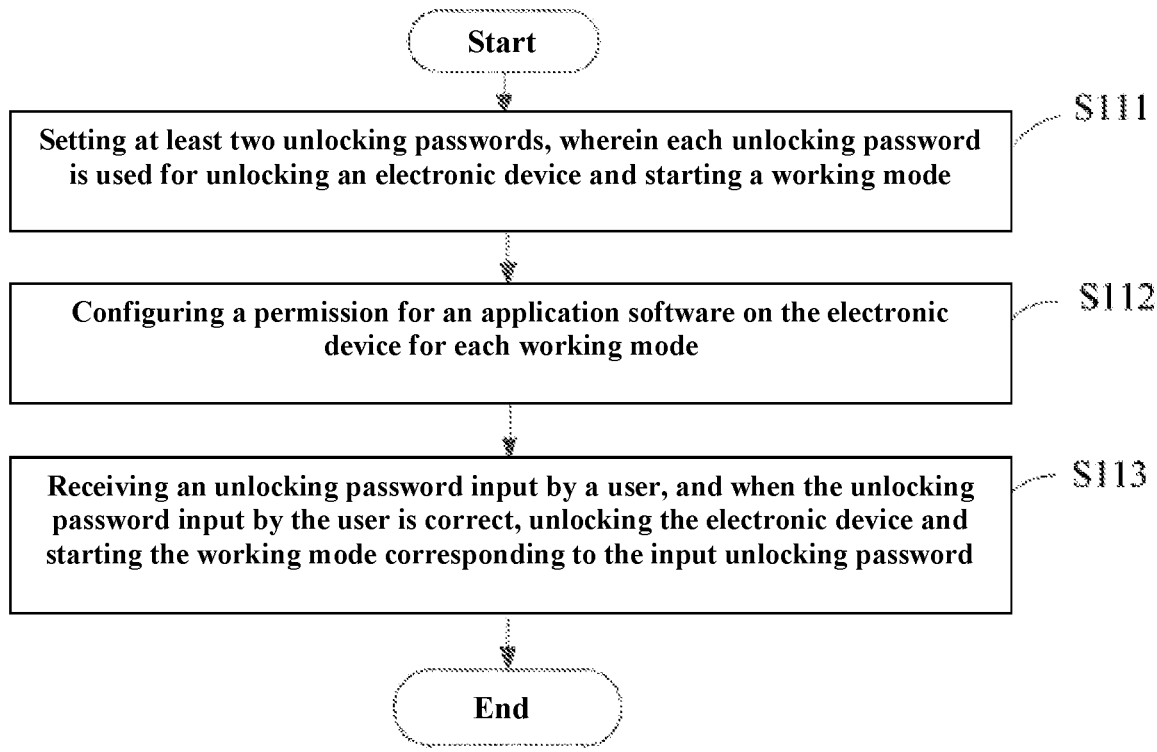
FIG. 4 is a flowchart of the permission management method applied to the electronic device shown in FIG. 1 according to a preferred embodiment of the present application.

In reference to FIG. 4, it is a flowchart of the permission management method applied to the electronic device 100 shown in FIG. 1 provided by a preferred embodiment of the present application. The method steps defined by the process related to the method can be implemented by the processor 113. The specific flow shown in FIG. 4 will be described in detail below.

Step S111, setting at least two unlocking passwords, wherein each unlocking password is used for unlocking an electronic device and starting a working mode; specifically, the process defined in step S111 can be performed and implemented by the setting module 1101 shown in FIG. 2.

More specifically, a primary unlocking password and at least one low-priority secondary unlocking password may be included in the set at least two unlocking passwords. In the working mode corresponding to the primary unlocking password, a user can have the authority or permission to operate all application software of the electronic device 100. In the working mode corresponding to the low-priority unlocking password, a user can only have the authority or permission to operate certain application software of the electronic device 100. In this embodiment of the present invention, the user with the full permission can set the specific permission and the unlocking password of the user who has only partial permission. In the foregoing, the unlocking process refers to an action of a user to wake up the electronic device 100 from a standby state to a working state by inputting specific password instructions (such as numbers, graphics, fingerprints, faces, voices, and the like).

Step S112, configuring a permission for an application software on the electronic device 100 for each working mode; specifically, the process defined in step S112 can be performed and implemented by the configuring module 1102 shown in FIG. 2.

The electronic device 100 configures the permission to use the application software 210 on the electronic device 100 for the working mode corresponding to each unlocking password. The electronic device 100 is configured to provide different permission for different application software 210 in different working modes. After the configuration is completed, the configuration information of the unlocking password and its corresponding working mode is stored in the electronic device 100.

Step S113, receiving an unlocking password input by a user, and when the unlocking password input by the user is correct, unlocking the electronic device 100 and starting the working mode corresponding to the input unlocking password; specifically, the process defined in step S113 can be performed and implemented by the unlocking module 1103 shown in FIG. 3.

More specifically, when a user inputs the unlocking password, the input unlocking password is compared to a previously set unlocking password. When the comparison is successful, the configuration information of the working mode corresponding to the input unlocking password is read, and finally the above configuration information is loaded to make the electronic device 100 enter a corresponding working mode.

In this embodiment, further, in step S112, the process of configuring the permission for application software on the electronic device 100 for each working mode includes configuring at least one application software 210 that is allowed to be used by the user for each working mode. Specifically, by means of scanning all of the application software 210 installed on the electronic device 100 and displaying the scanned application software 210 via a user interface to prompt the user to select at least one application software 210 therefrom, and then configure the at least one application software 210 selected by the user to be the application software 210 that is allowed to be used by the user.

More specifically, electronic device 100 can scan all of the application software 210 installed on the electronic device 100 and then display the icons or names of all of the scanned application software 210 via a user interface. Next, it can prompt the user to select at least one application software 210 therefrom, and then configure the at least one application software 210 selected by the user to be the application software 210 that is allowed to be used by the user.

Figure 5:
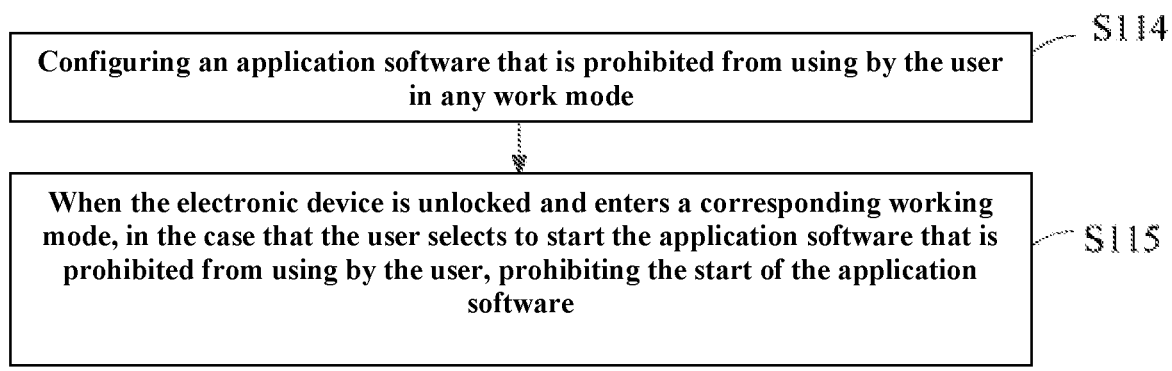
FIG. 5 is a partial flowchart of the permission management method in another preferred embodiment of the present application.

In reference to FIG. 5, in this embodiment, the permission management method further includes the Steps S114 and S115.

Step S114 is configuring an application software that is prohibited from using by the user in any working mode; more specifically, the step S114 can be a sub-step of the step S112, and this sub-step can be implemented by the configuring module 1102.

Step S115 is, when the electronic device 100 is unlocked and enters a corresponding working mode, in the case that the user selects to start the application software 210 that is prohibited from using by the user, prohibiting the start of the application software 210. Optionally, after the start of the application software is prohibited, the method further includes a step of alerting the user that the access to the application software is restricted. This step may be a sub-step of the step S115, or a step independent from the step S115. More specifically, the process defined by the step S115 can be implemented by the start prohibiting module 1104 shown in FIG. 2.

In one embodiment of the present invention, when the electronic device 110 is unlocked and enters a corresponding working mode, in the case that the user selects to start the application software 210 that is prohibited from using by the user, prohibiting the start of the application software 210 and alerting the user that the access to the application software is restricted. In this case, the action of selecting to start may be an operation of selecting or clicking an icon corresponding to the application software 210. Specifically, the alerting manner in which the electronic device 100 provides the alert for the restriction for access can be any one of text alerting information, voice alerting information and vibration alerting information, or any combination of the foregoing.

In other embodiments, the electronic device 100 may also display an interface for entering a password on a display interface. After the user inputs a correct password, the user who is not allowed to use the application software 210 may also use the application software 210, in this case, the correct password is the unlocking password with the permission to start the application software 210.

In another embodiment, when the electronic device 110 is unlocked and enters a corresponding working mode, determining whether the application software 210 that is prohibited from using by the user is running in the working mode, and if so, directly closing the application software 210. In the current available operating system (for example, the iOS or Android system) for the existing electronic device 100, the application software 210 may also run in the background after the electronic device 100 is locked, as a result, when the device is used by another person, application software 210 involving personal privacy (for example QQ, WeChat, email, contact list and the like) are not closed. If another user does not have the permission to use the above application software 210, the electronic device 100 will automatically close the above application software 210 when another user inputs the password to unlock and enter that working mode. Specifically, the electronic device 100 can close the application software 210 by means of killing the course of the application software 210.

In this embodiment, further, the permission management method may further include: when the electronic device 100 is unlocked and enters a corresponding working mode, hiding the icon of the application software 210 that is prohibited from using by the user in the working mode.

In reference to FIG. 6, in this embodiment, the permission management method further includes the Steps S116 and S117.

Step S116 is configuring at least one function of an application software 210 that is prohibited from using by the user in any working mode; more specifically, the step S116 can be a sub-step of the step S112, and this sub-step can be implemented by the configuring module 1102.

Step S117 is, when the electronic device is unlocked and enters a corresponding working mode, in the case that the user selects to start the at least one function of an application software 210 that is prohibited from using by the user, prohibiting the start of the function selected by the user by the corresponding application software 210. Optionally, the method further includes a step of alerting the user that the access to the specific function is restricted. This step may be a sub-step of the step S117, or a step independent from the step S117. More specifically, the process defined by the step S117 can be implemented by the function restricting module 1106 shown in FIG. 2.

Specifically, the electronic device 100 may further define the function of the application software 210 that is allowed to be started by the user. For example, for a browser, the electronic device 100 may also perform permission restriction on the browsing history record in the browser, so that the user can only use the functions other than seeing the browsing history. In this case, when the user selects to view the browsing history record, the electronic device 100 will alert the user that the function access is restricted. The manner in which the electronic device 100 can alert the user that the access to the function is restricted is similar to that of the step S115, and details will not be described herein again.

In this embodiment, further, the permission management method may further include: configuring the application software 210 that is allowed to automatically start in any working mode; when the electronic device 100 is unlocked and enters a working mode that is configured with the application software 210 that is allowed to start automatically, automatically starting the application software 210 that is allowed to start automatically.

In the several embodiments provided in this application, it should be understood that the disclosed devices and methods can also be implemented in other ways. The embodiments of device described above are merely for the purpose of description, for example, the flowcharts and block diagrams in the drawings illustrate possible implementations of the possible architectures, functions, and operations based on the devices, methods, and computer program products according to various embodiments of the present application. In this regard, each block in the flowchart or block diagram may represent a module, a portion of a program, or a portion of code, in which the module, the portion of a program, or the portion of code may contain one or more executable instructions for performing a specified logical function. It should also be noted that in some alternative implementations, the functions noted in the blocks may also occur in different orders than those noted in the figures. For example, two consecutive blocks may actually be executed substantially in parallel, or they may sometimes be executed in a reverse order, depending on the specific functions involved. It is also to be noted that the block diagram and/or each of the blocks in the flowchart, and the combination of block diagram and/or each of the blocks in the flowchart can be implemented by a dedicated hardware-based system that performs specified functions or actions, or can be achieved using a combination of dedicated hardware and computer instructions.

It can be understood that the embodiment of the present application may also provide an electronic device. The electronic device can include: a memory, a processor and a permission management system, in which the system is installed in the memory and includes one or a plurality of software functional modules executed by the processor, and the permission management system can include:

a setting module, which is used for setting at least two unlocking passwords, wherein each unlocking password is used for unlocking an electronic device and starting a working mode;

a configuring module, which is used for configuring a permission for an application software on the electronic device for each working mode; and an unlocking module, which is used for receiving an unlocking password input by a user, and when the unlocking password input by the user is correct, unlocking the electronic device and starting the working mode corresponding to the input unlocking password.

In addition, the function modules in one embodiment of the present application may be integrated together to form an independent part, or each module may exist alone, or two or more modules may be integrated to form an independent part.

The function mentioned above, if implemented in the form of software function modules and sold or used as separate products, may be stored in a computer readable storage medium. Based on such understanding, the part of the technical solution of the present application or the part that contributes to the prior art can be embodied in the form of a software product stored in a storage medium, including a plurality of instructions used to enable a computer device (which may be a personal computer, a server, or a network device, and so on) to perform all or part of the steps of the method described in each embodiment of the present application. The foregoing storage medium includes various media that can store program codes, such as a USB flash disk, a removable hard disk, a read-only memory (ROM), a random access memory (RAM), a magnetic disk, or an optical disk. It should be noted that in this paper, relational terms such as first and second, etc., are only used to distinguish one entity or operation from another entity or operation, and do not necessarily require or imply that these entities or operations actually have any such type of relation or order. Moreover, the terms "comprises", "includes" or any other variation thereof are intended to cover a non-exclusive inclusion, such that a process, method, article, or device that includes a list of elements not only includes those elements but also includes those that are not explicitly listed, or may also include the elements inherent to such a process, method, article, or device. In the case of no more limitation, the element defined by the sentence "comprising a . . . " does not exclude the existence of another identical element in the process, the method, the article, or the device.

The foregoing descriptions are merely preferred embodiments of the present application and are not intended to limit the present application. For a person skilled in the art, the present application may have various changes and variations. Any amendments, equivalent substitutions, improvements, etc., made within the spirit and principles of this application shall be included in the scope of protection of this application. It should be noted that the same reference numerals and letters refer to the same items in the following figures, and therefore, once an item is defined in one figure, it does not need to be further defined or explained in subsequent figures.

The foregoing descriptions are merely specific implementation manners of the present application, but the protection scope of the present application is not limited thereto. A person skilled in the art may easily think of the change or replacement within the technical scope disclosed by the present application, which should be encompassed by the scope of protection of the present application. Therefore, the protection scope of the present application should be defined by the protection scope of the claims.

The invention claimed is:

1. A permission management system, comprising:
   a setting module for setting at least two unlocking passwords comprising a first unlocking password assigned to a first user and a second unlocking password assigned to a second user, wherein each of the at least two unlocking passwords is used for unlocking an electronic device and starting a corresponding working mode;
   a configuring module for configuring a permission for an application software on the electronic device for each working mode;
   an unlocking module for receiving an unlocking password input by a user, and when the unlocking password input by the user is correct, unlocking the electronic device and starting the working mode corresponding to the unlocking password input;
   a start prohibiting module for:
      in response to determining that the electronic device is unlocked and in the working mode and receiving a selection, from the second user, of the application software that is prohibited from using by the second user in the working mode, displaying a password entering interface, and
      in response to receiving an application unlocking password for unlocking the application software via the password entering interface, starting the application software;
   wherein, when the electronic device is unlocked and enters the corresponding working mode, the start prohibiting module determines whether the application software that is prohibited from using by the user is running in the background in the working mode, and if so, closes the application software.

2. The permission management system according to claim 1, wherein the configuring module configuring the permission for the application software on the electronic device for each working mode comprises:
   displaying a user interface indicating one or more application software installed on the electronic device; and
   in response to receiving a second selection of a second application software of the one or more application software, configuring the second application software as being prohibited from using by the user;
   the permission management system further comprising the start prohibiting module for, when the electronic device is unlocked and enters the corresponding working mode, in a case that the user selects to start the second application software that is prohibited from using by the user, prohibiting a start of the second application software.

3. The permission management system according to claim 2, wherein the start prohibiting module further alerts the user that access to the second application software is restricted.

4. The permission management system according to claim 1, further comprising an icon managing module, wherein, when the electronic device is unlocked and enters the corresponding working mode, the icon managing module hides an icon of the application software that is prohibited from using by the user in the working mode.

5. The permission management system according to claim 1, wherein the function restricting module further alerts the user that access to the browsing history record viewing function is restricted.

6. The permission management system according to claim 1, wherein the configuring module configuring the permission for the application software on the electronic device for each working mode comprises configuring an application software that is allowed to automatically start in any working mode;
   the permission management system further comprising an application software automatically starting module, wherein, when the electronic device is unlocked and enters the corresponding working mode that is configured with the application software that is allowed to start automatically, the application software automatically starting module automatically starts the application software that is allowed to start automatically.

7. The permission management system according to claim 1, wherein the configuring module configuring the permission for the application software on the electronic device for each working mode comprises:
configuring at least one application software that is allowed for the user to use for each working mode; and
scanning all of the application software installed on the electronic device and displaying the scanned application software via a user interface and prompting the user to select at least one application software from the scanned application software, and configuring the at least one application software selected by the user to be the application software that is allowed to be used by the user.

8. The permission management system according to claim 1, wherein the unlocking password input comprises a fingerprint input from the user.

9. A permission management method, comprising:
setting at least two unlocking passwords comprising a first unlocking password assigned to a first user and a second unlocking password assigned to a second user, wherein each of the at least two unlocking passwords is used for unlocking an electronic device and starting a corresponding working mode;
configuring a permission for an application software on the electronic device for each working mode;
receiving an unlocking password input by a user, and in response to determining that the unlocking password input by the user is correct, unlocking the electronic device and starting the working mode corresponding to the unlocking password input;
in response to determining that the electronic device is unlocked and in the working mode and receiving a selection, from the second user, of the application software that is prohibited from using by the second user in the working mode, displaying a password entering interface,
in response to receiving an application unlocking password for unlocking the application software via the password entering interface, starting the application software, wherein the application software is associated with a browser application; and
in response to determining that the electronic device is unlocked and enters the corresponding working mode, and that the application software that is prohibited from using by the user is running in the background in the working mode, closing the application software.

10. The permission management method according to claim 9, wherein configuring the permission for the application software on the electronic device for each working mode comprises:
displaying a user interface indicating one or more application software installed on the electronic device; and
in response to receiving a second selection of a second application software of the one or more application software, configuring the second application software as being prohibited from using by the user; the permission management method further comprising:
determining that the electronic device is unlocked and enters the corresponding working mode,
determining that the user selects to start the second application software that is prohibited from using by the user, and
prohibiting the start of the second application software.

11. The permission management method according to claim 10, wherein after prohibiting the start of the second application software, the permission management method further comprising:
alerting the user that access to the second application software is restricted.

12. The permission management method according to claim 9, further comprising:
in response to determining that the electronic device is unlocked and enters the corresponding working mode, hiding an icon of the application software that is prohibited from using by the user in the working mode.

13. The permission management method according to claim 9, wherein configuring the permission for the application software on the electronic device for each working mode comprises configuring at least one function of an application software that is prohibited from using by the user; the permission management method further comprising:
determining that the electronic device is unlocked and enters the corresponding working mode; and
in response to determining that the user selects to start the at least one function of the application software that is prohibited from using by the user, prohibiting a start of the at least one function selected by the user of the application software.

14. The permission management method according to claim 13, wherein after the application software is prohibited from starting the at least one function selected by the user, the permission management method further comprising:
alerting the user that access to the at least one function is restricted.

15. The permission management method according to claim 9, wherein configuring the permission for the application software on the electronic device for each working mode comprises configuring an application software that is allowed to automatically start in any working mode; the permission management method further comprising
in response to determining that the electronic device is unlocked and enters the corresponding working mode that is configured with the application software that is allowed to start automatically, automatically starting the application software that is allowed to start automatically.

16. A non-transitory computer readable recording medium having recorded thereon a program for performing the permission management method according to claim 9.

17. The permission management method according to claim 9, wherein the unlocking password input comprises a fingerprint input from the user.

18. An electronic device, characterized in that the electronic device comprises:
a memory;
a processor; and
a permission management system, wherein the permission management system is installed in the memory and comprises one or a plurality of software functional modules executed by the processor, and the permission management system comprises:
a setting module for setting at least two unlocking passwords comprising a first unlocking password assigned to a first user and a second unlocking password assigned to a second user, wherein each of the at least two unlocking passwords is used for unlocking the electronic device and starting a corresponding working mode;

a configuring module for configuring a permission for an application software on the electronic device for each working mode;

an unlocking module for receiving an unlocking password input by a user, and when the unlocking password input by the user is correct, unlocking the electronic device and starting the working mode corresponding to the unlocking password input; and a start prohibiting module for:
- in response to determining that the electronic device is unlocked and in the working mode and receiving a selection, from the second user, of the application software that is prohibited from using by the second user in the working mode, displaying a password entering interface, and
- in response to receiving an application unlocking password for unlocking the application software via the password entering interface, starting the application software;

wherein, when the electronic device is unlocked and enters the corresponding working mode, the start prohibiting module determines whether the application software that is prohibited from using by the user is running in the background in the working mode, and if so, closing the application software.

* * * * *